June 11, 1957 J. B. LUBISCHER 2,795,344
APPARATUS FOR UNLOADING A COVER-EQUIPPED CONTAINER
WITH A MOLDED BLOCK OF MEAT THEREIN
Filed March 11, 1954 3 Sheets-Sheet 1
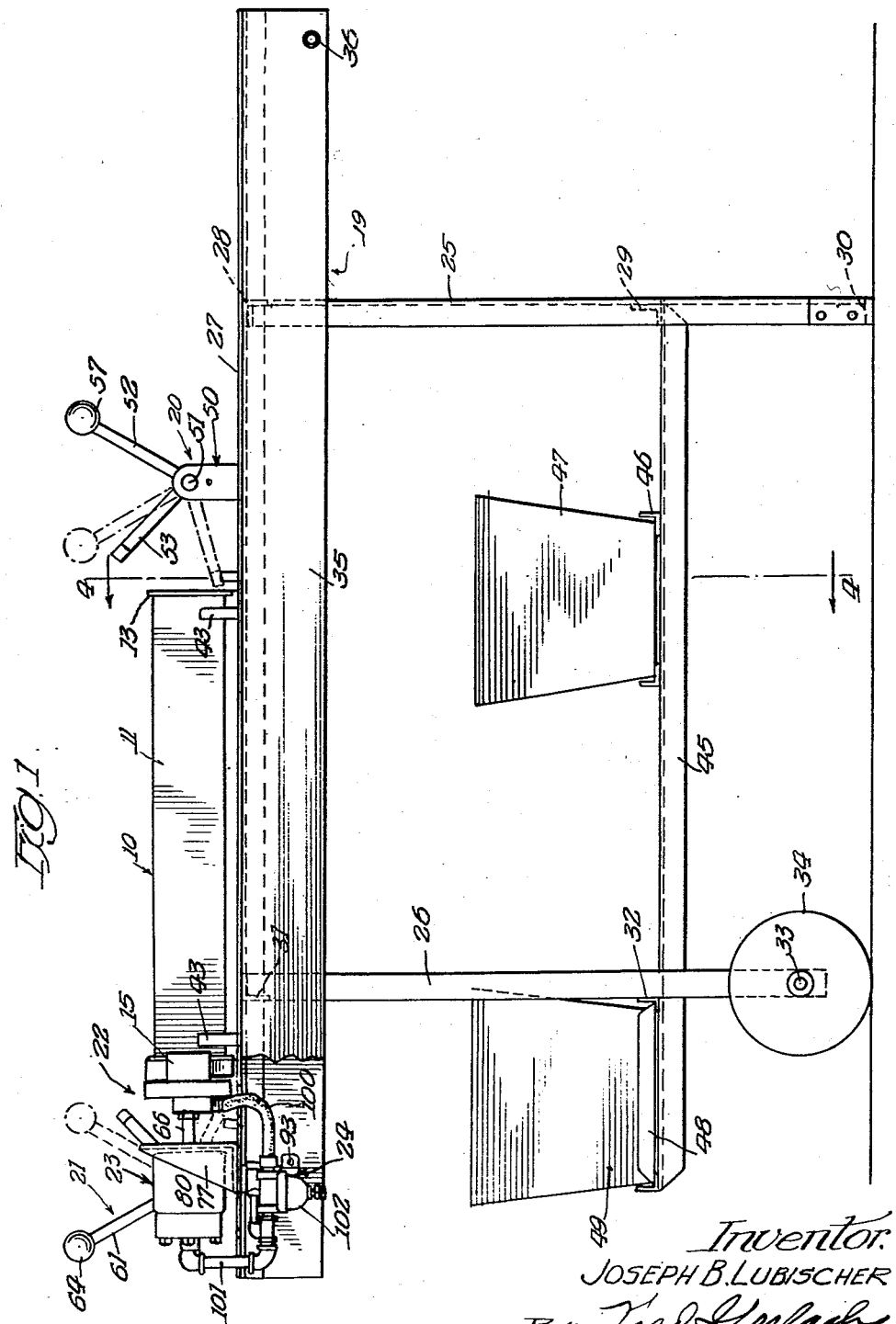
Inventor.
JOSEPH B. LUBISCHER
By: Fred Gerlach
Atty.

June 11, 1957  J. B. LUBISCHER  2,795,344
APPARATUS FOR UNLOADING A COVER-EQUIPPED CONTAINER
WITH A MOLDED BLOCK OF MEAT THEREIN
Filed March 11, 1954  3 Sheets-Sheet 2
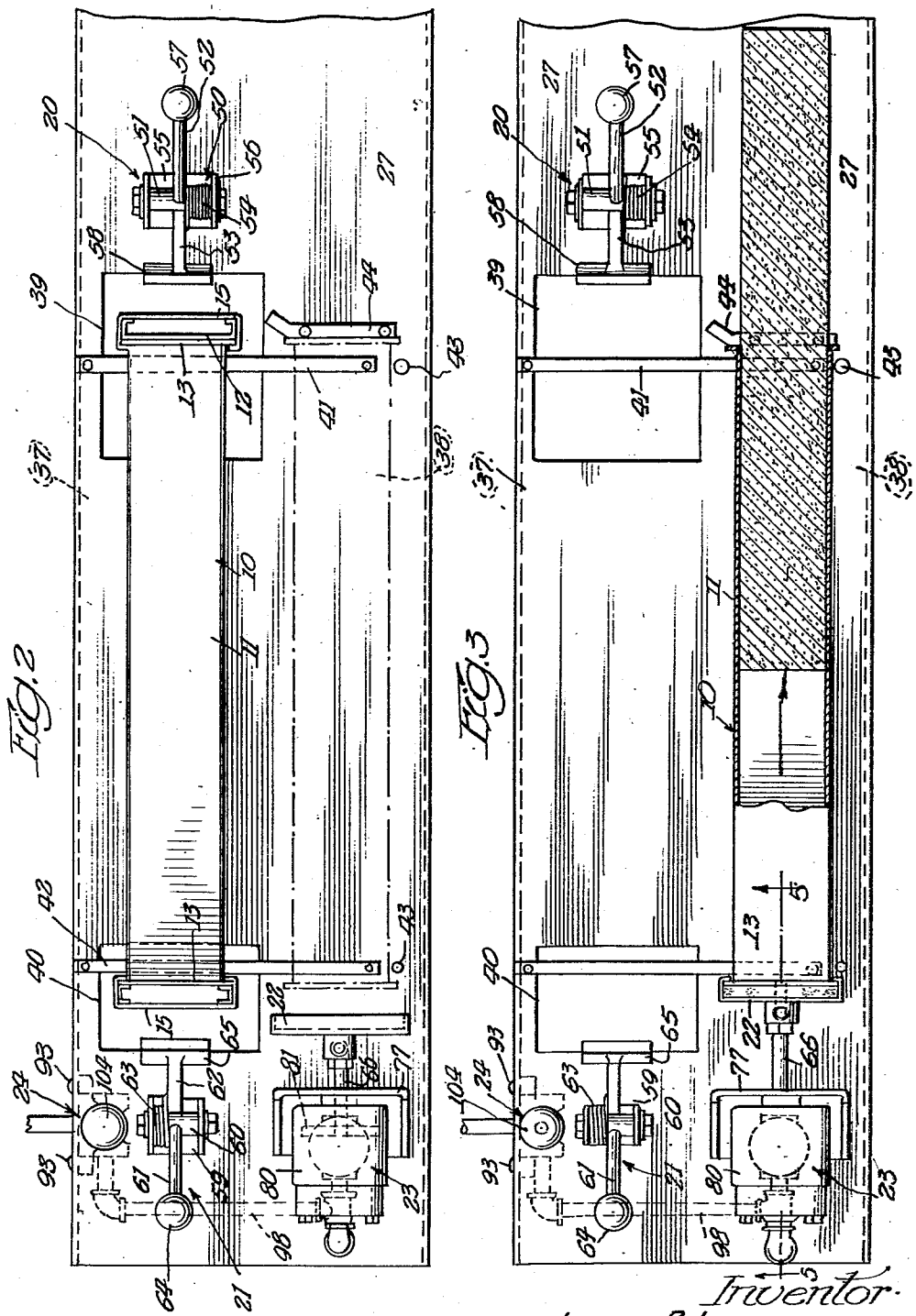
Inventor
JOSEPH B. LUBISCHER
By: Fred Gerlach, atty.

June 11, 1957  J. B. LUBISCHER  2,795,344
APPARATUS FOR UNLOADING A COVER-EQUIPPED CONTAINER
WITH A MOLDED BLOCK OF MEAT THEREIN
Filed March 11, 1954  3 Sheets-Sheet 3
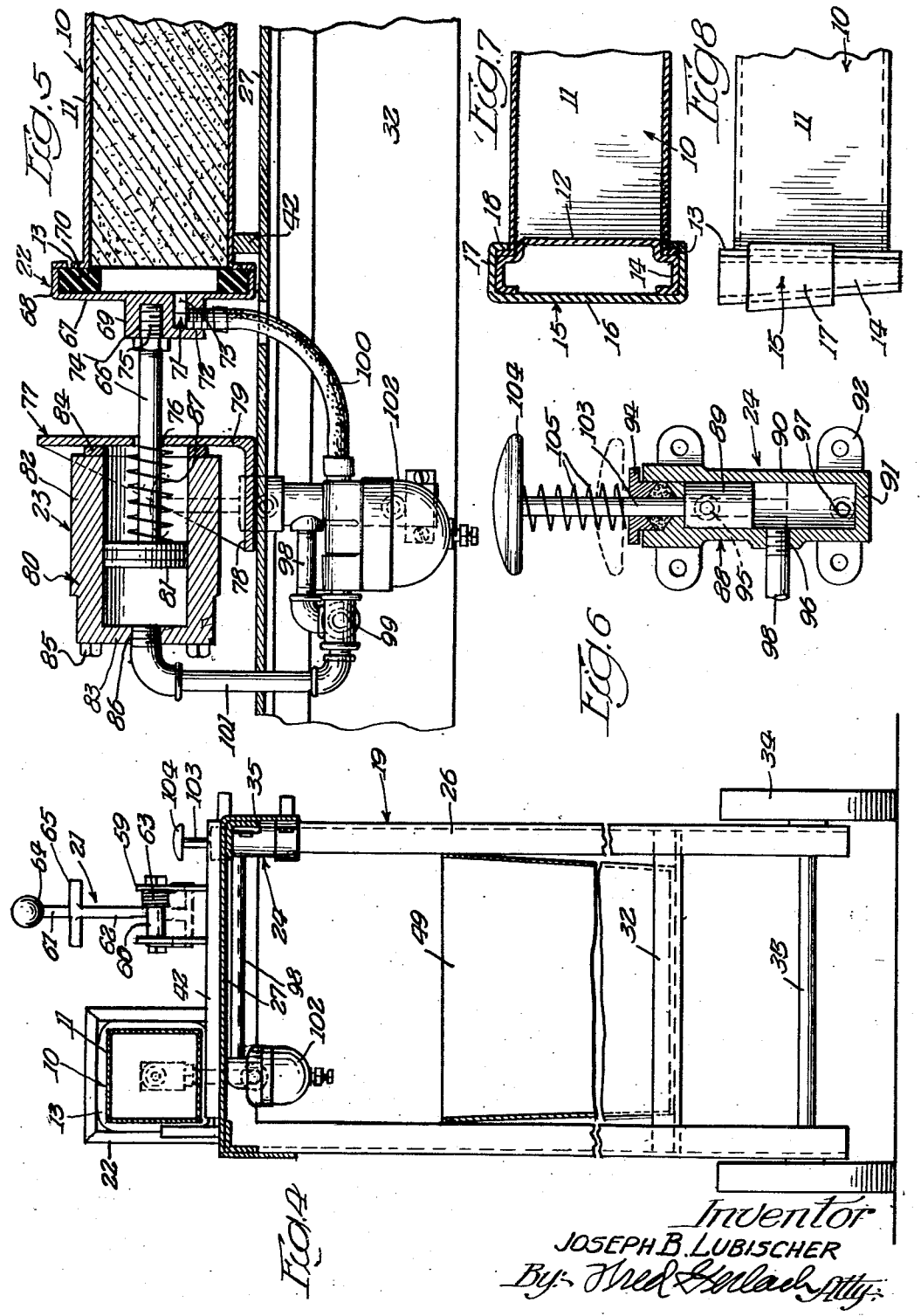
Inventor
JOSEPH B. LUBISCHER
By Fred Gerlach Atty.

United States Patent Office 2,795,344
Patented June 11, 1957

2,795,344

APPARATUS FOR UNLOADING A COVER-EQUIPPED CONTAINER WITH A MOLDED BLOCK OF MEAT THEREIN

Joseph B. Lubischer, Rochester, N. Y., assignor to The Allbright-Nell Company, Chicago, Ill., a corporation of Illinois Application March 11, 1954, Serial No. 415,602

8 Claims. (Cl. 214—304)

The present invention pertains to an apparatus for unloading a mold-type container for a meat product, such for example, as ground and mixed sandwich meat.

It is now common practice in the meat packing industry to utilize a container of the type that comprises: (1) an elongated open-ended sheet metal body which is rectangular in cross section and embodies at its ends integral outwardly extending rectangular flanges; (2) two stamped metal covers which are shaped conformably to, and are adapted to have their marginal portions fit flatly against, the outwardly extending flanges on the ends of the body and serve when in place to close the ends of the body; and (3) two U-shaped clamping members which have inwardly extending hooks on the free ends of the side pieces thereof, are adapted to be slid laterally into straddled relation with the covers and flanges, and are so constructed that when they are slid into their operative or normal position they operate to clamp the covers against the flanges with a wedging action. In utilizing a container of the aforementioned type, one end of the body is closed by applying to it one of the covers and one of the U-shaped clamping members. Thereafter, the ground and mixed sandwich meat is introduced into the body interior by way of the other or open end of the body. In most instances, the meat is introduced into the interior of the body under comparatively high pressure and by way of a conventional stuffing horn. After the container body has been filled to capacity, the other cover and U-shaped clamping member are applied to the end that both ends of the container body are closed or sealed. After the body is closed, the container with the ground and mixed sandwich meat mixed therein is subjected to a heated atmosphere in order to cook the meat. At the conclusion of the cooking operation, the U-shaped clamping members and the covers are removed from the ends of the container body. Thereafter, the meat in the form of a molded block is extruded from the container by applying pressure to one end of the block of meat. After extrusion of the block of meat from the body of the container, the block is chilled so as to form a solid mass and is then sliced as a preliminary to use.

One object of the invention is to provide an apparatus which serves not only to remove the clamping members and covers from the ends of the body of a container of the aforementioned type after cooking of the meat in the body interior but also to extrude the molded block of meat from the body interior after removal of the clamping members and covers, and is characterized by the fact that it embodies a simple and novel arrangement of parts, is highly efficient in operation, and occupies a minimum amount of space. In general, the apparatus comprises a frame structure having at the top thereof an elongated horizontally extending platform, one portion of which serves as a cover removing station and another portion of which serves as a meat extruding station.

Another object of the invention is to provide an apparatus of the aforementioned character in which the two stations extend lengthwise of the platform of the frame structure and are arranged in side-by-side relation, and the platform is provided with transversely extending guide rails which extend between the ends of the stations and are adapted to support the ends of the body of the container and permit the container to be slid laterally from the cover removing station to the meat extruding station.

Another object of the invention is to provide an apparatus of the character and type under consideration in which the platform of the frame structure has openings at the ends of the cover removing station, and the ends of such station have associated therewith manually operable lever variety devices which, in connection with actuation thereof while the container is at the cover removing station, operate to release the U-shaped clamping members and the covers so that they drop by gravity through the aforesaid openings.

Another object of the invention is to provide an apparatus of the aforementioned type in which the frame structure embodies an elongated horizontally extended subplatform which is disposed beneath and an appreciable distance from the main platform and is adapted to support a pair of receptacles under the aforementioned openings in the main platform.

Another object of the invention is to provide an apparatus of the type and character under consideration in which one end of the meat extruding station has associated with it a gasket-equipped head which is mounted to slide into and out of an operative position wherein it is in seated relation with the adjacent open end of the container when the latter is at the meat extruding station, and has a duct for introducing air under pressure into said adjacent open end of the container in order to effect extrusion of the molded block of meat through the other open end of the container.

Another object of the invention is to provide an apparatus of the last mentioned character in which the gasket-equipped head is slid into and out of its operative position by way of a pneumatically actuated cylinder-piston device.

A further object of the invention is to provide in connection with an apparatus of the type heretofore mentioned simple valve means for controlling the flow of air under pressure to the duct in the basket-equipped head and the cylinder of the cylinder-piston device for sliding the head into and out of its operative position.

A still further object of the invention is to provide an apparatus which effectively and efficiently fulfills its intended purpose and not only is portable but also is capable of being produced at a comparatively low cost.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of an apparatus embodying the invention;

Figure 2 is a plan view showing the container that is to be acted on by the apparatus at the cover removing station;

Figure 3 is a plan view showing the container in place at the meat extruding station and also showing the gasket-equipped head in its operative position wherein it is seated against the adjacent open end of the body of the container;

Figure 4 is an enlarged vertical transverse section taken on the line 4—4 of Figure 1;

Figure 5 is an enlarged vertical longitudinal section taken on the line 5—5 of Figure 3 and illustrating in detail the construction and design of the gasket-equipped head and the pneumatically actuated cylinder-piston device for shifting the head into and out of its operative position;

Figure 6 is a vertical section of the valve for controlling the flow of air under pressure to the air duct in the gasket-equipped head and the cylinder of the cylinder-piston device;

Figure 7 is an enlarged horizontal section of one end of the container, showing in detail the construction and arrangement of the U-shaped covers and the U-shaped clamping members for closing the ends of the container; and Figure 8 is a fragmentary side view of the container.

The apparatus that is shown in the drawings constitutes the preferred form or embodiment of the invention. It is primarily adapted for use in the meat packing industry and serves as a medium or instrumentality for first removing the covers of a mold-type container 10 with a block of ground and mixed sandwich meat therein and then extruding the block of meat from the body of the container. The container 10 is of conventional or standard design and comprises an elongated open ended sheet metal body 11 and a pair of covers 12 for closing the ends of the body. The body 11 of the container is square in cross section and has at the ends thereof continuous integral outwardly extending flanges 13. The covers 12 are in the form of sheet metal stampings and are shaped conformably to the flanges 13. They are adapted when in place to have their marginal portions fit against the flanges on the ends of the container body 11 and embody on opposite sides of their marginal portions, full length, parallel, outwardly extending side members 14. The outer margins of the side members of each cover lie in a plane that is inclined at a small acute angle with respect to the plane of the marginal portion of the cover. The covers are releasably secured in place by a pair of U-shaped clamping members 15. The latter are in the form of metal stampings and consist of crosspieces 16 and side pieces 17 at the ends of the crosspieces. The side pieces extend at right angles to the crosspieces 16 and are provided at the free ends thereof with inwardly extending hooks 18 (see Figures 7 and 8). The clamping members 15 are adapted when the covers 12 are in place across the ends of the container body 10 to be slid laterally into a position wherein the side pieces 17 thereof are in straddled relation with the side members 14 of the covers and the inwardly extending hooks 18 on the free ends of their side members are in hooked relation with the portions of the flanges 13 that are adjacent the inner margins of the cover side members 14. When the clamping members 15 are properly slid into place, the ends of the crosspieces 16 thereof engage the outer margins of the cover side pieces 14 with a wedging action and thus result in the covers being clamped in place. The container 10 is substantially the same as that forming the subject matter of United States Patent No. 2,665,822, dated January 12, 1954. In connection with use of the container 10, it is contemplated that one of the covers will first be applied to one end of the body 11. It is also contemplated that after application of the one cover the interior of the body will be filled with ground and mixed sandwich meat and then the other cover will be applied so as fully to close the container. In addition, it is contemplated that the container with the meat therein will be subject to a heated atmosphere in order to cook the meat. The apparatus as heretofore indicated serves to remove the covers after the cooking operation and subsequently to extrude the block of molded meat from the interior of the body. As its principal parts or components, the apparatus comprises a portable frame structure 19, a pair of manually operable lever variety devices 20 and 21, a gasket-equipped head 22, a cylinder-piston device 23 for shifting the head into and out of its hereinafter described operative position, and a valve 24.

The frame structure 19 is horizontally elongated and comprises a pair of laterally spaced uprights 25 at one end, a pair of laterally spaced uprights 26 at the other end and a horizontally extending platform 27 at the top. The uprights 25 are in the form of angle bars and have the upper ends thereof cross-connected by a horizontally extending angle bar 28. The central portion of the uprights 25 are cross-connected by a horizontally extending angle bar 29 and the lower ends of such uprights are provided with floor-engaging feet 30. The uprights 26 are in the form of angle bars and have the upper ends thereof cross-connected by way of a horizontally extending angle bar 31. The central portions of the uprights 26 are cross-connected by way of a horizontally extending angle bar 32 which is horizontally aligned with the angle bar 29. A horizontal axle 33 extends through the lower ends of the uprights 26 and carries at the ends thereof ground wheels 34. The latter permit the apparatus as a whole to be wheeled from place to place in the same manner as a wheelbarrow. The platform 27 of the frame structure 19 is formed of heavy gauge sheet metal for purposes of rigidity and has its end portions resting on, and riveted or otherwise fixedly secured to, the angle bars 28 and 31. It embodies at its side margins depending side walls 35, certain portions of which fit against, and are secured to, the upper ends of the uprights 25 and 26. The platform 27 is of such length that its ends project appreciable distances outwards of the uprights 25 and 26. The ends of the platform side walls 35 that are outwards of the uprights 25 are provided with a pair of outwardly extending, fixedly mounted handles 36. The latter are used by the operator of the apparatus when the apparatus is wheeled from one place to another. One end portion of one side of the platform 27 constitutes a cover removing station and the corresponding end portion of the other side of the platform constitutes or forms a meat extruding station. The cover removing station is designated by the reference numeral 37 and extends lengthwise of the platform. The meat extruding station is designated by the reference numeral 38 and is in parallel and side-by-side relation with the cover removing station 37. It is contemplated that the container 10 will first be positioned at the cover removing station and then shifted laterally or sidewise so that it is disposed at the meat extruding station. The platform 27 is provided with a pair of spaced-apart rectangular openings 39 and 40. The opening 39 is located at the inner end of the cover removing station 39 and the opening 40 is located at the outer end of such station. The purpose of the two openings is to permit the covers 12 and the clamping members 15 to drop through the platform after they are removed from the ends of the container body by the lever variety devices 20 and 21. The inner ends of the stations 37 and 38 are cross-connected by a horizontally extending guide rail 41 which extends transversely across, and is riveted or otherwise fixedly secured to, the top surface of the platform 27. Such rail serves to support and guide the inner end of the container 10 in connection with shift of the latter from the cover removing station 37 to the meat extruding station 38. The outer ends of the two stations are cross-connected by horizontally extending guide rail 42 which extends transversely across, and is riveted or otherwise fixedly secured to, the top surface of the platform. The guide rail 42 is disposed in parallel relation with the guide rail 41 and serves to support and guide the outer end of the container 10 in connection with lateral shift of the container from the station 37 to the meat extruding station 38. The two guide rails are so spaced-apart that when the container is mounted on them, they are disposed directly inwards of the continuous outwardly extending flanges 12 on the ends of the container body 11. Disposed directly outwards of the ends of the guide rails that are at the meat extruding station 38 are two posts 43. Such posts are connected to, and project upwards from, the platform 27 and form stops for preventing the container from being slid outwards past the station 38. At the inner end of the station 38 is a bar 44 which when the container 10 is at the station 38 engages the bottom portion of the flange at the inner end of the container body and forms a stop for limiting longitudinal displacement of the container in one direction. The bar 44 extends transversely of, and is riveted or otherwise fixedly secured to, the top surface of the platform 27 and is located a small distance inwards of the adjacent end of the guide rail 41. The inner end of the stop-forming bar 44 is bent or angled inwards in order to guide the bottom portion of the flange at the inner end of the container during shift of the container from the cover removing station 37 to the meat extruding station 38. In connection with use of the apparatus, the container 10 with the covers 12 and the clamping members 15 in place at the ends of the container body 11 is placed on the ends of the guide rails that extend across the station 37. It is positioned as shown in full lines in Figure 2 of the drawings and so that the small ends of the side members 14 of the covers extend or face downwards. When the container is so positioned, the covers may be readily removed by the devices 20 and 21 as described hereafter. The central portions of the uprights 25 and 26 are cross-connected by way of a pair of horizontally extending angle bars 45. The latter extend lengthwise of the frame structure and form a subplatform under the platform 27. The inner end portions of the angle bars 45 support a holder 46 for a receptacle 47 and the outer ends of the angle bars 45 support a holder 48 for a receptacle 49. The holder 46 is located beneath the opening 39 in the platform and serves releasably to retain in place the receptacle 47. Such receptacle is adapted to catch the cover and the clamping member that are removed from the inner end of the container when the container is located at the cover removing station 37. The holder 48 is located under the opening 40 in the platform 27 and serves releasably to hold in place the receptacle 49. The latter is adapted to catch the cover and clamping member that are removed from the outer end of the container when the latter is located at the station 37.

The manually operable lever variety device 20 is located at the inner end of the cover removing station 37 and comprises a bracket 50, a rock shaft 51, a hand lever 52, an arm 53 and a coil spring 54. The bracket 50 of the device 20 is U-shaped and consists of a horizontally extending intermediate part 55 and a pair of upwardly extending side parts 56 at the ends of the intermediate part. It is located inwards of the opening 39 at the inner end of the station 37 and is arranged so that its side parts 56 are in parallel relation with the side margins of the platform 27. The intermediate part 55 of the bracket rests on, and is riveted or otherwise fixedly secured to, the portion of the platform 27 that is inwards of the opening 39. The rock shaft 51 extends horizontally and has the ends thereof journalled in coaxial holes in the upper ends of the side parts 56 of the bracket 50. The hand lever 52 is fixedly connected to, and extends radially from, the central portion of the rock shaft 51. It has at its outer end a fixed spherical knob 57 for gripping purposes and is so arranged that it normally extends upwards and away from the opening 39. The arm 53 of the device 20 is connected to, and extends radially from, the central portion of the rock shaft 51 and embodies at its outer end a fixed, horizontal extending striker block 58. It extends at approximately a 90° angle with respect to the hand lever 52 and is so arranged that it normally projects upwards and towards the opening 39 in the platform 27. When the hand lever 52 is swung in a counter-clockwise direction as viewed in Figure 1, the arm 53 swings downwards and causes its striker block 58 to engage and slide downwards the U-shaped clamping member on the inner end of the container 10. Downward sliding movement on the part of the clamping member releases the member and also the cover at the inner end of the container and results in the member and cover dropping through the opening 39 into the receptacle 47 on the holder 46. The coil spring 54 serves to retract the hand lever 52 and the arm 53. It extends around the rock shaft 51 and has one end thereof positioned in a hole in the adjacent side part of the bracket 50. The other end of the spring is looped around the proximal end of the arm 53.

The manually operable lever variety device 21 is located at the outer end of the cover removing station 37. It is the same in design and mode of operation as the device 20 and comprises a U-shaped bracket 59, a horizontally extending rock shaft 60, a hand lever 61, an arm 62 and a coil spring 63. The intermediate part of the bracket 59 is disposed a small distance outwards of the opening 40 and fits against, and is riveted or otherwise fixedly secured to, the top surface of the platform 27. The hand lever 61 extends radially from the central portion of the rock shaft 60. It embodies a spherical knob 64 at its outer end and is arranged so that it normally extends upwards and away from the opening 40 in the platform 27. The arm 62 is connected to, and extends radially from, the central portion of the rock shaft 60 and is provided at its outer end with a horizontally extending striker block 65. It is disposed at approximately a 90° angle with respect to hand lever 61 and is so arranged that it normally extends upwards and towards the opening 40. When the container 10 is at the cover removing station 37 and the hand lever 61 is swung in a clockwise direction as viewed in Figure 1, the arm 62 swings downward and causes its striker block 65 to engage and slide downwards the U-shaped clamping member 15 on the outer end of the container 10. Downward sliding movement on the part of such clamping member results in release of the cover on the outer end of the container. As soon as the last mentioned clamping member and cover are released, they drop through the opening 40 into the receptacle 49 on the holder 48.

The head 22 of the apparatus is located adjacent the outer end of the meat extruding station 38 and is mounted by way of a horizontally extending rod 66 so that it is slidable into and out of an operative position wherein it is in seated relation with the outer end of the container body 11 when the container 10 is at the meat extruding station 38 (see Figures 3 and 5). It is cup-shaped and consists of a crosswall 67 and a continuous side wall 68. The crosswall 67 extends vertically and is disposed transversely of the platform 27. It is square and embodies on its central portion an integral enlargement 69 which extends away from the outer end of the station 38. The side wall 68 is connected to the marginal portion of the crosswall 67 and projects towards the outer end of the meat extruding station 38. It is materially larger than the flange 13 on the outer end of the container body 11 and surrounds a square gasket 70. The latter is cemented in place and when the head 22 is in its operative position abuts against the flange on the outer end of the container body and forms a fluid-tight seal between the head and said outer end of the body of the container. The enlargement 69 on the central portion of the crosswall of the head is provided with an inverted L-shaped duct 71. The latter comprises a vertically extending inlet branch 72 and a horizontally extending outlet branch 73. The inlet branch 72 is formed in the lower portion of the enlargement 69 and the outlet branch 73 communicates with the upper end of the inlet branch and extends through the central portion of the crosswall 69 of the head 22. When the head is in its operative position as shown in Figures 3 and 5 and air under pressure is supplied to the duct 71, the air enters the outer end of the container body and effects extrusion of the molded block of meat in the body by forcing it out through the inner end of the container body. The rod 66 for supporting the head 22 so that it is slidable into and out of its operative position extends lengthwise of the platform 27 and is disposed outwards of the outer end of the meat extruding station 38. The inner end of the rod, that is, the end that is nearer the outer end of the station 38, fits within a socket 74 in he enlargement and is secured in place by a screw thread connection 75. The central portion of the rod 66 extends through, and is slidably mounted in, a hole 76 in a bracket 77. The latter is located outwards of the outer end of the meat extruding station 38 and comprises a horizontally extending wall 78 and a vertically extending wall 79. The wall 78 rests on, and is suitably secured to, the subjacent portion of the platform 27. The vertically extending wall 79 of the bracket 77 is connected to, and projects upwards from, the horiozntally extending wall 78 and extends transversely of the platform 27. The hole 76 is formed in the central portion of the vertically extending wall 79. When the rod 66 is slid towards the meat extruding station 38, while the container 10 is at such station, the gasket-equipped head 22 slides into seated relation with the flange at the outer end of the container body and results in the container being clamped between the head and the stop-forming bar 44. It is contemplated that after the head is slid into its operative position wherein it is in sealed relation with the flange on the outer end of the container body, air under pressure will be supplied to the duct 71 in order to effect extrusion of the block of molded meat through the open inner end of the body of the container.

The pneumatically actuated cylinder-piston device 23 serves to slide the head 22 into and out of its aforementioned operative position. It is located outwards of the outer end of the meat extruding station 38 and comprises a cylinder 80 and a piston 81. The cylinder is mounted on the bracket 77 and consists of a cylindrical side wall 82 and a crosswall 83 at one end of the side wall. The side wall 82 extends horizontally and has its other end disposed adjacent the outer surface of the vertically extending wall 79 of the bracket 77. A gasket 84 is interposed between said other end of the side wall 82 of the cylinder 80 and the outer surface of the wall 79. The cylinder is secured in place by horizontally extending bolts 85 which extend longitudinally through the side wall 82 and into screw threaded holes (not shown) in the vertically extending wall 79. The crosswall 83 of the cylinder has in its central portion a screw threaded hole 86 whereby air under pressure may be admitted into the interior of the cylinder. The cylinder 80 extends around, and is in concentric relation with, the outer end of the rod 66, that is, the end of the rod that is farther from the outer end of the meat extruding station 38. The piston 81 of the device 23 is slidably mounted in the cylinder 80 and is suitably connected to the adjacent end of the rod 66. When air under pressure is introduced into the cylinder 80 via the hole 86, the piston 81 is caused to slide in the direction of the meat extruding station 38 and operates through the medium of the rod 66 to shift the gasket-equipped head 22 into its operative position. A helical compression spring 87 serves to retract the piston 81 and resultantly to slide or shift the head 22 out of its operative position. Such spring surrounds the outer end of the rod 66 and has one end thereof in abutment with the central portion of the vertically extending wall 79 of the bracket 77. The other end of the spring bears against the piston 81. When air under pressure is released from the cylinder, the spring 87 operates to slide the piston toward the crosswall 83 of the cylinder 80. Such sliding movement on the part of the piston causes the head 22 to slide away from the outer end of the container 10 and thus release the container so that it may be removed manually from the meat extruding station 38 after a meat extruding operation.

The valve 24 of the apparatus serves to control the flow of air under pressure to the duct 71 and the cylinder 80 of the cylinder-piston device 23. It is located adjacent the lever variety cover removing device 21 and comprises a vertically elongated housing 88 and a piston-like valve member 89. The housing 88 of the valve 24 is located under the platform 27 and consists of a vertically extending cylindrical side wall 90 and a crosswall 91 at the lower end of the side wall 90. The last mentioned wall embodies at its ends, outwardly extending lugs 92 which fit against one of the sides 35 of the platform 27. Bolts 93 extend through aligned holes in the lugs 92 and the adjacent portion of said one side of the platform 27 and serve to hold the valve housing 88 in place. The upper end of the cylindrical side wall 90 of the valve housing 88 is provided with a stuffing box 94. The side wall 90 is provided with an inlet port 95, an outlet port 96 and a vent port 97. The inlet port 95 is formed in the upper end of the side wall 90 and is connected by a pipe (not shown) to any suitable source air under pressure. The outlet port 96 is formed in the central portion of the side wall 90 and is connected to one end of a pipe 98. The vent port 97 is formed in the lower end of the side wall 90 and leads to atmosphere. The other end of the pipe 98 is connected to the intermediate branch of a T-fitting 99. One end branch of the fitting 99 is connected by a flexible pipe arrangement 100 to the vertically extending inlet branch 72 of the duct 71 in the enlargement 69; and the other end branch of the fitting 99 is connected by pipe arrangement 101 to the hole 86 in the crosswall 83 of the cylinder 80. If desired, an air cleaner 102 may be included in the pipe arrangement 100 in order to remove dust particles from the air under pressure that is delivered to the duct 71. The valve member 89 of the valve 24 is mounted for vertical sliding movement in the housing 88. When the valve member is slid downwards to its fullest extent (see dotted lines in Figure 6), it closes the vent port 97 and establishes communication between the inlet port 95 and the outlet port 96. When the two last mentioned ports are in communication, air under pressure flows into the duct 71 via the pipe 98 and pipe arrangement 100 and into the cylinder 80 via the pipe 98 and the pipe arrangement 101. When the valve member 89 of the valve 24 is slid upwards to its fullest extent as shown in full lines in Figure 6, it closes the inlet port 95 and establishes communication between the outlet port 96 and the vent port 97. When the last two mentioned ports are in communication with one another, the cylinder 80 and the duct 71 are vented to atmosphere. The valve member 89 is provided with a vertically extending stem 103. Such stem projects upwards from the valve member and extends slidably through the stuffing box 94. It extends through a hole in the platform 27 and is provided at its upper end with a knob 104. The valve member 89 is urged upwards by way of a helical compression spring 105. Such spring surrounds the upper end of the stem 103 and has its lower end in abutment with the platform 27. The upper end of the spring 105 bears against the bottom surface of the knob 104. When it is desired to slide the head 22 into its operative position and to supply air under pressure to the duct 71 for meat extruding purposes, the valve member 89 is slid downwards. This is accomplished by forcing the knob 104 downwards against the force of the spring 105. When it is desired to shift the head 22 out of its operative position and to discontinue the supply of air under pressure to the duct 71 at the conclusion of a meat extruding operation, the knob 104 is released. This results in the spring 105 sliding the valve member 89 into its up position wherein it closes the inlet port 95 and establishes communication between the outlet port 96 and the vent port 97 as heretofore described.

When it is desired to use the apparatus, the container 10, after the body thereof has been filled with ground and mixed meat, is positioned over the cover removing station 37 and then manipulated so that the small ends of the side members 14 of the covers 12 face downwards. Thereafter, the container is lowered until the ends of the body 11 are brought to rest on the subjacent ends of the guide rails 41 and 42. At the conclusion of this step or operation, the hand levers 52 and 61 of the manually operable lever variety devices 20 and 21 are swung towards the container. This, as previously pointed out, results in the arms 53 and 65 swinging downwards and effecting release of the U-shaped clamping members 15. As soon as the clamping members are released, such members and the covers 12 drop through the openings 39 and 40 into the receptacles 47 and 49. After removal of the covers from the ends of the body 11, the container is shifted sidewise until it is arrested by the posts 43. The container after being arrested by the posts is located at the meat extruding station 38. As soon as the container is located at the last mentioned station, the operator of the apparatus pushes downwards on the knob 104. This results in the supply of air under pressure to the duct 71 in the enlargement 69 and also to the cylinder 80 of the pneumatically actuated cylinder-piston device 23. As soon as air under pressure enters the cylinder 80, the piston slides in the direction of the outer end of the container and operates through the medium of the rod 66 to shift the gasket-equipped head 22 into its operative position wherein the gasket thereof abuts against the outwardly extending flange on the outer end of the container body. As soon as the head is in seated relation with the adjacent end of the container body, the air under pressure that flows through the duct 71 forces the molded block of meat out of the container body. After unloading of the container, the operator releases the knob 104 so that the spring 105 returns the valve member 89 to its up position. As soon as the valve member reaches such position, the supply of air under pressure to the duct 71 is discontinued and the cylinder 80 of the device 23 is vented to atmosphere. As soon as the air under pressure is released from the cylinder, the spring 87 slides the piston in the opposite direction and results in retraction of the head 22. Retraction of the head releases the container body so that it may be manually removed from the meat extruding station 38.

The herein described apparatus embodies but a comparatively small number of parts and is capable of being produced at a comparatively low cost. It is highly efficient in operation and occupies but a small amount of space. Because the frame structure includes the wheels 34, the apparatus as a whole may be readily transported from place to place.

Whereas the apparatus has been described as being for use in connection with a container, the covers of which are releasably secured in place by U-shaped clamping members, it is to be understood that the apparatus may be used with any container, the covers of which have slide-type means for securing them to the ends of the container body. It is also to be understood that the invention is not to be restricted to the details set forth since these may be modified within the scope of the appended claims without departing from the spirit or scope of the invention.

Having thus described the invention what I claim as new and desire to secure by Letters Patent is:

1. An apparatus designed to remove a molded block of meat from a container of the type that comprises an elongated open-ended body adapted to have the meat introduced under pressure into its interior and provided at its ends with outwardly extending flanges, and covers adapted to extend across and close the ends of the body after introduction of the meat into the interior of the body and having associated therewith means adapted to slide into and out of gripping relation with the flanges and serving when in such relation releasably to hold the covers in place, said apparatus comprising in combination: a frame structure provided at the top thereof with a horizontal platform having one portion thereof serving as a cover removing station for the container and an adjacent portion serving as a meat extruding station for the container; means extending between the two stations and operative to support the container so that it is shiftable laterally from the cover removing station to the meat extruding station, devices mounted on the platform adjacent to the ends of the cover removing station, embodying movably mounted parts, and operative when the parts are moved while the container is at the cover removing station to slide the cover holding means out of gripping relation with the flanges on the ends of the container body and thus release the covers; a head located at one end of the meat extruding station and mounted so that, when the container after a cover removing operation is at the meat extruding station, it is shiftable into and out of seated relation with the adjacent end of the container body; and means associated with the head and operative when the head is in seated relation with the adjacent end of the container body to introduce air under pressure into said adjacent end of the container in order to force the molded block of meat out of the container body through the latter's other end.

2. An apparatus designed to remove a molded block of meat from a container of the type that comprises an elongated open-ended body adapted to have the meat introduced under pressure into its interior and provided at its ends with outwardly extending flanges, and covers adapted to extend across and close the ends of the body after introduction of the meat into the interior of the body and having associated therewith means adapted to slide into and out of griping relation with the flanges and serving when in such relation releasably to hold the covers in place, said apparatus comprising in combination: a frame structure provided at the top thereof with a horizontal platform having one portion thereof serving as a cover removing station for the container and an adjacent portion serving as a meat extruding station for the container; spaced-apart, horizontally extending, horizontal guide rails mounted on the platform, extending between the ends of the two stations and operative to support the ends of the container so that said container is shiftable both horizontally and laterally from the cover removing station to the meat extruding station; posts connected to, and extending upwards from the platform and arranged so that they form stops for preventing the container from being slid past the meat extruding station; devices mounted on the platform adjacent to the ends of the cover removing station, embodying movably mounted parts, and operative when the parts are moved while the container is at the cover removing station to slide the cover holding means out of gripping relation with the flanges on the ends of the container body and thus release the covers; a gasket-equipped head located at one end of the meat extruding station and mounted so that, when the container after a cover removing operation is at the meat extruding station, it is shiftable into and out of sealed relation with the adjacent end of the container body; means associated with the head and operative when the head is in seated relation with the adjacent end of the container body to introduce air under pressure into said adjacent end of the container in order to force the molded block of meat out of the container body through the latter's other end; and means mounted on the platform adjacent to the other end of the meat extruding station and forming an upstanding stop which engages a portion of the adjacent flange on the container body when the container is at said meat extruding station and prevents the container from moving longitudinally in a direction away from the head.

3. An apparatus designed to remove a molded block of meat from a container of the type that comprises an elongated open-ended body adapted to have the meat introduced under pressure into its interior and provided at its ends with outwardly extending flanges, and covers adapted to extend across and close the ends of the body after introduction of the meat into the interior of the body and having associated therewith means adapted to slide into and out of gripping relation with the flanges and serving when in such relation releasably to hold the covers in place, said apparatus comprising in combination: a frame structure provided at the top thereof with a horizontal platform having one portion thereof serving as a cover removing station for the container and an adjacent portion serving as a meat extruding station for the container, and having openings at the ends of the cover removing station, said frame structure being provided with a sub-platform disposed beneath the platform and provided with means for releasably holding receptacles beneath said openings; means extending between the two stations and operative to support the container so that it is shiftable laterally from the cover removing station to the meat extruding station; devices mounted on the platform adjacent to the ends of the cover removing station, embodying movably mounted parts, and operative when the parts are moved while the container is at the cover removing station to slide the cover holding means out of gripping relation with the flanges on the ends of the container body and thus release the covers so that they drop by gravity through said openings into said receptacles; a head located at one end of the meat extruding station and mounted so that, when the container after a cover removing operation is at the meat extruding station, it is shiftable into and out of seated relation with the adjacent end of the container body; and means associated with the head and operative when the head is in seated relation with the adjacent end of the container body to introduce air under pressure into said adjacent end of the container in order to force the molded block of meat out of the container body through the latter's other end.

4. An apparatus designed to remove a molded block of meat from a container of the type that comprises an elongated open-ended body adapted to have the meat introduced under pressure into its interior and provided at its ends with outwardly extending flanges, and covers adapted to extend across and close the ends of the body after introduction of the meat into the interior of the body and having associated therewith means adapted to slide into and out of gripping relation with the flanges and serving when in such relation releasably to hold the covers in place, said apparatus comprising in combination: a frame structure provided at the top thereof with a horizontal platform having one portion thereof serving as a cover removing station for the container and an adjacent portion serving as a meat extruding station for the container; means extending between the two stations and operative to support the container so that it is shiftable laterally from the cover removing station to the meat extruding station; devices mounted on the platform adjacent to the ends of the cover removing station, embodying movably mounted parts, and operative when the parts are moved while the container is at the cover removing station to slide the cover securing means out of gripping relation with the flanges on the ends of the container body and thus release the covers; a gasket-equipped head located at one end of the meat extruding station and mounted so that, when the container after a cover removing operation is at the meat extruding station, it is shiftable into and out of sealed relation with the adjacent end of the container body; means associated with the head and operative when the head is in seated relation with the adjacent end of the container body to introduce air under pressure into said adjacent end of the container in order to force the molded block of meat out of the container body through the latter's other end; and a valve-controlled fluid pressure operated device mounted on the platform and operative to shift the head into and out of its said seated relation with the adjacent end of the container body.

5. An apparatus designed to remove a molded block of meat from a container of the type that comprises an elongated open-ended body adapted to have the meat introduced under pressure into its interior and provided at its ends with outwardly extending flanges, and covers adapted to extend across and close the ends of the body after introduction of the meat into the interior of the body and having associated therewith means adapted to slide into and out of gripping relation with the flanges and serving when in such relation releasably to hold the covers in place, said apparatus comprising in combination; a frame structure provided at the top thereof with a horizontal platform having one portion thereof serving as a cover removing station for the container and an adjacent portion serving as a meat extruding station for the container; spaced apart, horizontally extending, guide rails mounted on the platform, extending between the ends of the two stations and operative to support the container so that said container is shiftable laterally from the cover removing station to the meat extruding station; posts connected to, and extending upwards from, the platform and arranged so that they form stops for preventing the container from being slid past the meat extruding station; devices mounted on the platform adjacent to the ends of the cover removing station, embodying movably mounted parts, and operative when the parts are moved while the container is at the cover removing station to slide the cover securing means out of gripping relation with the flanges on the ends of the container body and thus release the covers; a gasket-equipped head located at one end of the meat extruding station and provided with a horizontal shaft whereby it is mounted so that, when the container after a cover removing operation is at the meat extruding station, it is shiftable into and out of seated relation with the adjacent end of the container body; means associated with the head and operative when the head is in seated relation with the adjacent end of the container body to introduce air under pressure into said adjacent end of the container in order to force the molded block of meat out of the container body through the latter's other end; and a valve controlled, pneumatically actuated cylinder-piston device mounted on the platform, operative to shift the head into and out of its said seated relation with the adjacent end of the container body, and consisting of a cylinder around the rod and a piston mounted slidably in the cylinder and connected fixedly to said rod.

6. An apparatus designed to remove a molded block of meat from a container of the type that comprises an elongated open-ended body adapted to have the meat introduced under pressure into its interior and provided at its ends with outwardly extending flanges, and covers adapted to extend across and close the ends of the body after introduction of the meat into the interior of the body and having associated therewith means adapted to slide into and out of gripping relation with the flanges and serving when in such relation releasably to hold the covers in place, said apparatus comprising; a frame structure provided at the top thereof with a horizontal platform having one portion thereof serving as a cover removing station for the container and an adjacent portion serving as a meat extruding station for the container; means extending between the two stations and operative to support the container so that is is shiftable laterally from the cover removing station to the meat extruding station; devices mounted on the platform adjacent to the ends of the cover removing station, embodying movably mounted parts, and operative when the parts are moved while the container is at the cover removing station to slide the cover holding means out of gripping relation with the flanges on the ends of the container body and thus release the covers; a head located at one end of the meat extruding station, mounted so that, when the container after a cover removing operation is at the meat extruding station, it is shiftable into and out of seated relation with the adjacent end of the container body, and provided with a duct adapted when the head is in seated relation with the adjacent end of the container body to introduce air under pressure into said adjacent end of the container in order to force the molded block of meat out of the container body through the latter's other end; a pneumatically actuated cylinder-piston device mounted on the platform and operative to shift the head into and out of its said seated relation with the adjacent end of the container body; and means including a single control valve for supplying air under pressure to the duct and also the cylinder of the cylinder-piston device.

7. An apparatus designed to remove a molded block of meat from a container of the type that comprises an elongated open-ended body, said apparatus comprising: a frame structure provided at the top thereof with a horizontal platform having one portion thereof serving as a meat extruding station for the container; a head located at one end of the meat extruding station and provided with a horizontal rod whereby it is mounted so that, when the container is at the meat extruding station, it is shiftable horizontally into and out of seated relation with the adjacent end of the container body; means associated with the head and operative when the head is in seated relation with the adjacent end of the container body to introduce air under pressure into said adjacent end of the container in order to force the molded block of meat out of the container body through the latter's other end; and a fluid pressure actuated cylinder-piston device mounted on the platform, operative to shift the head into and out of its said seated relation with the adjacent end of the container body, and consisting of a cylinder extending around a portion of the rod and a piston mounted slidably in the cylinder and connected fixedly to said rod.

8. An apparatus designed to remove a molded block of meat from a container of the type that comprises an elongated open-ended body adapted to have the meat introduced under pressure into its interior, said apparatus comprising: a frame structure provided at the top thereof with a horizontal platform having one portion thereof serving as a meat extruding station for the container; a head located at one end of the meat extruding station, provided with a rod whereby it is mounted so that, when the container is at the meat extruding station, it is shiftable horizontally into and out of seated relation with the adjacent end of the container, and having a duct adapted when the head is in seated relation with the adjacent end of the container body to introduce air under pressure into said adjacent end of the container in order to force the molded block of meat out of the container body through the latter's other end; a pneumatically actuated cylinder-piston device mounted on the platform, consisting of a horizontal cylinder around a portion of the rod and a piston slidably mounted on the cylinder and connected fixedly to said rod, and arranged so that when air under pressure is introduced into the cylinder, the piston operates through the medium of the rod to shift the head into its said seated relation with the adjacent end of the container; a spring arranged to retract the piston upon release of air under pressure from the cylinder; and a two-position valve mounted on the frame structure, comprising an elongated housing and a valve member slidably mounted in the housing, having at one end of the housing an inlet port with means for connecting it to means from air under pressure, having in the central portion of the housing a discharge port connected to said duct and the cylinder of the cylinder-piston device, having at the other end of the housing a vent port to atmosphere, adapted when the valve member is slid in one direction to have the vent port closed and communication established between the inlet and discharge ports, and adapted when the valve member is slid in the opposite direction to have the inlet port closed and communication established between the discharge and vent ports.

References Cited in the file of this patent

UNITED STATES PATENTS

| | | |
|---|---|---|
| 1,221,321 | Hendler | Apr. 3, 1917 |
| 1,425,337 | Priskey | Aug. 8, 1922 |
| 1,664,667 | Davis | Apr. 3, 1928 |
| 2,196,081 | Reynoldson | Apr. 2, 1940 |
| 2,379,090 | LeBeau | June 26, 1945 |
| 2,386,152 | Wahl | Oct. 2, 1945 |